Figure 1:
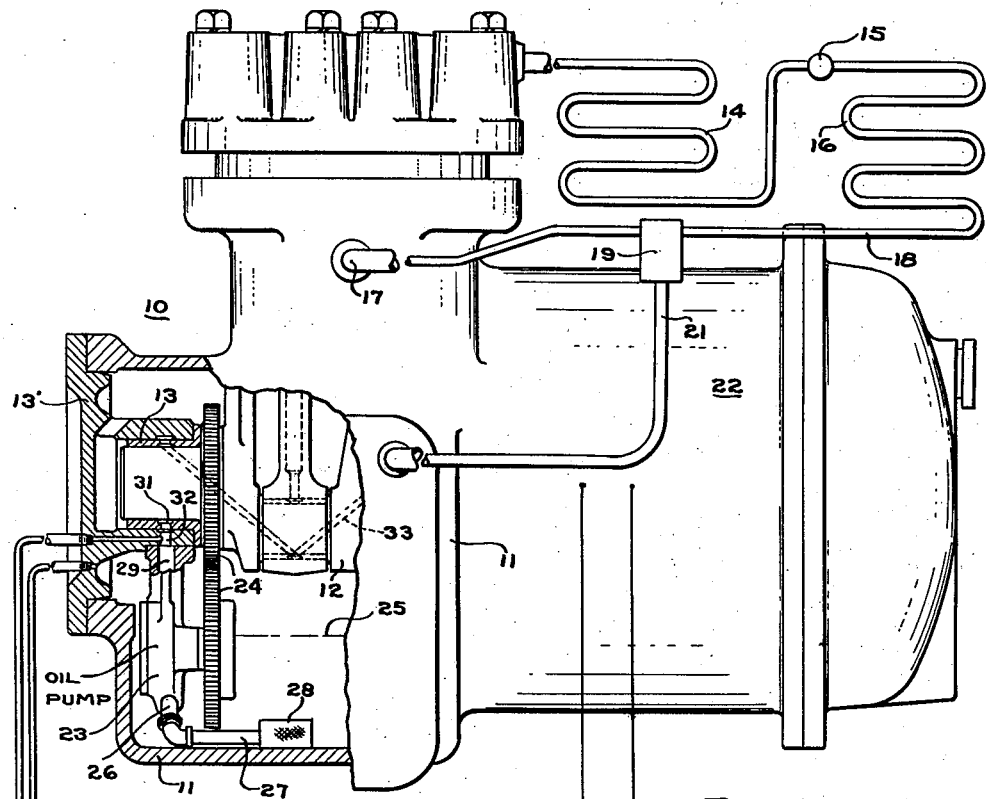

May 7, 1940.  E. R. WOLFERT  2,199,426

CONTROL MECHANISM

Filed Dec. 31, 1936

INVENTOR
EDWARD R. WOLFERT
BY
ATTORNEY

Patented May 7, 1940

2,199,426

UNITED STATES PATENT OFFICE 2,199,426

CONTROL MECHANISM

Edward R. Wolfert, Springfield, Mass., assignor to Westinghouse Electric & Manufacturing Company, East Pittsburgh, Pa., a corporation of Pennsylvania Application December 31, 1936, Serial No. 118,424

8 Claims. (Cl. 184—6)

My invention relates to control mechanism, more particularly to control mechanism for a machine having a lubricant pump driven simultaneously with the machine for supplying lubricant thereto, and it has for an object to provide a control mechanism that guards against damage to the bearings of the machine due to lack of lubricant.

Various types of machines, such as compressors for refrigerating systems, are provided with an oil pump operated by or simultaneously with the machine for the purpose of supplying oil under pressure to the bearings and other lubricated working surfaces of the machine. The oil pump stops whenever the machine stops, so that there is no oil pressure at the moment of starting the compressor. However, a sufficient film of oil remains on the bearings from previous operation of the oil pump to lubricate the pump for the short period of time necessary for the oil pump to establish oil pressure and to deliver oil to said bearings. Thus, if the oil pump is working properly, adequate lubrication will be obtained, but if it is not working properly, continued operation of the machine will likely cause damage to the bearings of the machine in a relatively short time.

It is an object of my invention to provide a control mechanism that permits the machine when started to operate for the brief period necessary for the pump to deliver oil to the bearings, during which time the residual film provides lubrication, and that terminates operation of the machine upon predetermined deficiency in oil supply after said period.

A further object is to provide a control mechanism of the character set forth that will operate in conjunction with an automatic regulating device controlling the operation of the machine.

In accordance with my invention, I provide a control mechanism having an automatic regulating device for controlling the operation of the machine. I also provide a timing device controlled by said regulating device so that its timing action begins when the machine is started. If said timing action continues for a predetermined period of time, the machine is shut down. However, if oil pressure is established by the oil pump within said predetermined period of time, as in normal operation, the timing action is terminated and the machine continues in operation under control of said automatic regulating device.

A further feature of the invention when incorporated in a refrigerant compressor or the like, in which the bearings and the oil reservoir are subjected to refrigerant pressure, resides in means differently responsive to both the inlet and discharge pressures of the oil pump, so that the mechanism is responsive to that oil pressure which is actually developed by the pump and which is effective to deliver oil to the bearings.

Figure 2:
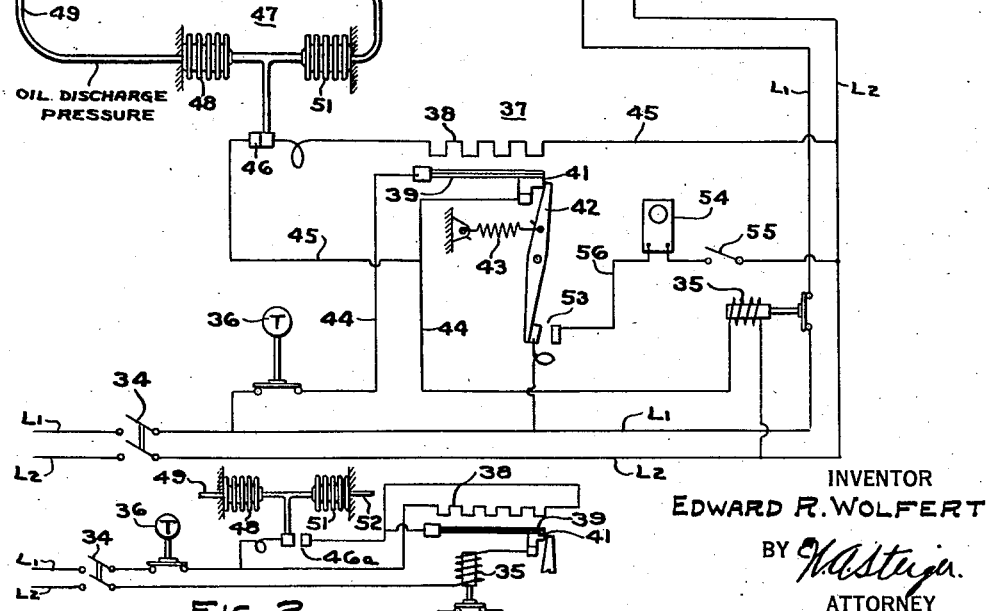

The above and other objects are effected by my invention as will be apparent from the following description and claims taken in connection with the accompanying drawing, forming a part of this application, in which:

Fig. 1 is a diagrammatic view of apparatus in accordance with my invention; and, Fig. 2 is a diagrammatic view of a modification of the control mechanism.

Referring to the drawing in detail, I show, at 10, a compressor of the reciprocating type having a crankcase 11 and a crankshaft 12 mounted in bearings of the compressor, one of which is carried by a closure member 13'. I prefer to provide a motor compressor unit of the hermetically sealed type and, therefore, the crankcase 11 is formed with an integral extension 22 that forms a casing in which the motor for driving the compressor is disposed.

In the illustrated embodiment, the compressor 10 forms part of a refrigerating system which includes a condenser 14, an expansion valve or other expansion device 15, and an evaporator 16. The outlet of the evaporator is connected to the inlet 17 of the compressor through a conduit 18, in which there is disposed an oil separator 19. The oil separated from the vaporized refrigerant is drained from the separator 19 to the crankcase 11 through a conduit 21. The pressure prevailing in the interior of the crankcase, therefore, is the pressure of refrigerant in the evaporator or the low side of the refrigerating system. Such pressure may be greater or less than atmospheric pressure, depending upon the particular refrigerant that is used. In the case of dichlorodifluoromethane, also known by the trade name of "Freon", it is usually somewhat greater than atmospheric pressure.

The compressor is provided with an oil pump 23, which is preferably located within the crankcase 11, and may be driven by the crankshaft 12 through gears 24. A sufficient portion of the pump 23 is disposed below the surface of the oil, shown at 25, so as to insure priming of the pump at all times. The inlet 26 of the oil pump communicates with the bottom of the crankcase preferably through a conduit 27 and a strainer 28.

The oil pump 23 has a discharge passage 29 from which oil is delivered to the bearings and any other surface to be lubricated, in any suitable manner known in the art. In the illustrated embodiment, the bearing 13 is formed with an annular groove 31 communicating with the discharge passage 29 through a port 32. The crankshaft 12 has a passage 33 drilled therein, which communicates with the annular passage 31 and with other crankshaft bearings.

The control mechanism for the motor compressor unit comprises a regulating device responsive to the refrigerating demand. For example, the regulating device may be a thermostatic switch 34 responsive to the temperature of the air or other medium cooled by the evaporator 16.

The control mechanism for the motor compressor unit is supplied with electric current from line conductors $L_1$ and $L_2$ in which a manual switch 34 may be connected. The motor 22 may be supplied with current from the line conductors $L_1$ and $L_2$, as in the illustrated embodiment, or it may be supplied with current of higher voltage from another source. In either case, it is controlled by the contacts of a relay 35. A regulating device is provided for controlling the motor compressor unit in accordance with an operating condition of the apparatus. Such regulating device may be a thermostatic switch 36, responsive to the temperature of the air or other medium cooled by the evaporator 16 and operative to close its contacts as said temperature rises above a desired value and to close them as it drops below the desired value. A time delay or timing device 37 includes a heating element 38, a thermostatic element 39 and contacts 41. It is preferably provided with a latch mechanism comprising a lever 42 and a tension spring 43.

The relay 35 is controlled by the thermostatic switch 36 and the time delay device 37 through a circuit 44 which extends from the line conductor $L_1$ through the contacts of the thermostatic switch 36, the thermostatic element 39 and the contacts 41 of the time delay device, and the coil of the relay device 35 to the line conductor $L_2$. The heating element 38 is included in a circuit 45 which extends from the line conductor $L_1$ first in common with the circuit 44 through the contacts of the thermostatic switch 36, the thermostatic element 39 and the contacts 41, and then extends through contacts 46 and the heating element 38 to the line conductor $L_2$. The contacts 46 are adapted to be opened by a pressure responsive mechanism 47 when the oil pump 23 develops sufficient oil pressure to assure oil supply to the bearings of the compressor.

The pressure responsive mechanism 47 includes a bellows 48 connected through a tube 49 to the oil discharge port 32, and a bellows 51 connected through a tube 52 to the interior of the crankcase 11. These bellows act in opposition to each other, and are so arranged that the differential or excess of the oil pump discharge pressure above the crankcase pressure acts in the direction to open the contacts 46. Inasmuch as the crankcase may be at a substantially higher pressure than atmospheric pressure, the pressure at the discharge of the oil pump will be at such pressure even if the oil pump is not operating. Hence, by opposing the refrigerant pressure in the crankcase against the oil pump discharge pressure, the pressure responsive mechanism operates in response to the pressure that is actually developed by the pump and is effective to deliver oil to the bearings against the refrigerant pressure in the crankcase.

An alarm device 54 may be provided to indicate operation of the time delay device. It is connected in a circuit 56 having contacts 53 actuated by the latch lever 42, and a manual switch 55.

Operation

The compressor and the other parts of the refrigerating apparatus operate in the usual manner of such apparatus. Vaporized refrigerant is compressed by the compressor, condensed in the condenser 14, and conveyed through the expansion valve 15, where its pressure is reduced, and then through the evaporator 16, in which it is vaporized. From the latter, it passes through the conduit 18 to the oil separator 19, wherein the oil is separated therefrom and, then to the compressor inlet 17.

The operation of the control mechanism is as follows: Assume the compressor to be shut down, so that the oil discharge pressure is equal to the refrigerant pressure in the crankcase. Accordingly, the contacts 46 are closed. Assume that the time delay device 37 is deenergized and that the contacts 41 are closed. The switch 34 is closed upon demand for operation of the refrigerating apparatus, such as increase in the temperature of the air cooled by the evaporator 16. The thermostatic switch 36 closes its contacts, thereby completing both circuits 44 and 45. The relay 35 completes the circuit to the motor 22 so that operation of the compressor is started. At this time, the bearings of the compressor are lubricated by the residual film of oil that remains from previous operation. The closing of the circuit 45 energize the heating element 38 to which the thermostatic element 39 is exposed. The heating element 38 and the thermostatic element 39 are designed so that the thermostatic element will open the contacts 41 when the heating element 38 has been energized a predetermined period of time. Such period of time is chosen so that it will be long enough to permit the oil pump to develop sufficient oil pressure and will be less than the period during which the compressor can be safely operated on the basis of the residual oil film. If the oil pump is in proper working condition, it will quickly develop sufficient oil pressure for lubrication. As such pressure is developed, the pressure in the bellows 48 will exceed the pressure in the bellows 51 sufficiently to open the contacts 46. Further energization of the heating element 38, or timing action of the time delay device, is thereby terminated and the apparatus continues in normal operation.

If, however, the oil pump is not in proper working condition and does not develop sufficient oil pressure to assure adequate lubrication, or if the pump fails to deliver oil pressure for any other reason, such as wrong direction of rotation of the motor, lack of oil in the crankcase, or because of dirt in the oil lines, the contacts 46 remain closed. Continued heating of the heating element 38 causes the thermostatic element 39 to bend upwardly, opening the contacts 41. The lever 42, biased by the spring 43, engages the movable contact 41 to latch the same in open position. Both circuits 44 and 45 are opened by the contacts 41, thereby deenergizing the relay 35 so that it opens the circuit to the motor 22 to terminate operation of the motor compressor unit. The opening of the circuit 45 terminates further and unnecessary energization of the heating element 38.

The operation of the control mechanism is the same if failure of oil pressure should occur at any time that the compressor is in operation. The contacts 46 are immediately closed in response to the loss of oil pressure and the circuits 44 and 45 are opened a predetermined time thereafter if oil pressure is not restored.

The movement of the lever 42 also closes the contacts 53 thereby energizing the alarm device 54. The circuit 56 may be opened by the switch 55 until the latch mechanism of the time delay device is reset.

In Fig. 2, I show a modification of the control circuit in which the heating element 38 is in series with the coil of the relay 35 and is adapted to be short-circuited by contacts 46a. The latter are arranged, in this embodiment, to close in response to oil pressure of predetermined value and to open in the absence of such oil pressure. When starting, the contacts 46a are open, so that the current for the coil of the relay 35 passes through and energizes the heating element 38. When oil pressure is established, the contacts 46a close to short circuit the heating element 38 and terminate energization thereof. Energization of the heating element 38 for a predetermined period of time causes the thermostatic element 39 to open the contacts 41 to deenergize the coil of the relay 35, which in turn terminates operation of the compressor. The operation of this embodiment in other respects is the same as that of the first embodiment.

From the above description, it will be seen that I have provided mechanism for effecting automatic control of the compressor while safeguarding the same against damages due to lack of lubricant.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination of a driven machine, means for driving said machine, means operable simultaneously with said machine for supplying lubricant to the bearings of said machine, a timing device, means for effecting timing action of said timing device in response to operation of said machine, means operable automatically upon supply of lubricant to said bearings to terminate said timing action, and means operable automatically in response to timing action of said timing device for a predetermined period of time to terminate operation of said machine.

2. The combination of a driven machine, a lubricant pump operable simultaneously with said machine for delivering lubricant under pressure thereto, a motor for driving said machine, a circuit for controlling energization of said motor, an automatic control device for controlling said circuit, a timing device whose timing action is controlled by said automatic control device and which is operative to open said circuit when said timing action continues for a predetermined period of time, and means responsive to lubricant pressure developed by said pump for terminating timing action of said timing device.

3. The combination of a driven machine, a lubricant pump operated simultaneously with the machine for supplying lubricant thereto, an electric motor for driving the machine, a time delay device, means for effecting operation of the time delay device upon energization of said motor in the absence of lubricant supply to the machine, means responsive to supply of lubricant to said machine for terminating operation of said time delay device, and means responsive to operation of said time delay device for a predetermined period of time for terminating energization of said motor.

4. The combination of a driven machine, a lubricant pump operable simultaneously with said machine for delivering lubricant under pressure thereto, a motor for driving said machine, a first circuit for controlling energization of said motor, a second circuit, an automatic control device for controlling said first and second circuits and arranged to close both of said circuits to initiate operation of said machine, means responsive to lubricant pressure developed by said pump for opening said second circuit, and means responsive to energization of said second circuit for a predetermined period of time for opening said first circuit.

5. The combination of a driven machine, a lubricant pump operable simultaneously with said machine for delivering lubricant under pressure thereto, a motor for driving said machine, a circuit for controlling energization of said motor, an automatic control device for controlling said circuit, a time delay device including an electric heating element and a thermostatic switch subjected to the heat generated by said heating element and connected in said circuit, said time delay device being adapted to open said circuit upon energization of said heating element for a predetermined period of time, a second circuit controlled by said automatic control device for energizing said heating element, a switch in said second circuit in series with said automatic control device, and means responsive to lubricant pressure developed by said pump for opening said last-mentioned switch.

6. The combination of a driven machine, a motor for driving said machine, a pump for supplying lubricant to the bearings of said machine, a first circuit for controlling said electric motor, a second circuit for operating said time delay device, means for energizing said second circuit in response to both energization of said first circuit and absence of lubricant supply to said bearings, means for deenergizing said second circuit in response to supply of lubricant to said bearings, and means responsive to energization of said time delay device for a predetermined period of time for deenergizing said first circuit, said last-mentioned means including latch means for maintaining said first circuit deenergized until the latch means is manually reset.

7. The combination of a refrigerant compressor having bearings and a lubricant reservoir subjected to substantially the same refrigerant pressure, a lubricant pump driven by said compressor and having its inlet communicating with said reservoir, means for conveying lubricant from the discharge of said pump to the bearings of said machine, and means responsive to a predetermined minimum difference between the pressures on the inlet and discharge sides of said pump for terminating operation of said compressor.

8. The combination of a reciprocating compressor having a crank case under pressure and a bearing in said crankcase, a lubricant pump operable simultaneously with said compressor for supplying lubricant to said bearing, and means responsive to a predetermined minimum difference between the pressure in said crankcase and the discharge pressure of said pump for terminating operation of said compressor.

EDWARD R. WOLFERT.